United States Patent
Mustapha

(10) Patent No.: US 11,129,089 B2
(45) Date of Patent: *Sep. 21, 2021

(54) SIGNALLING IN MOBILE TELECOMMUNICATIONS

(71) Applicant: NEC CORPORATION, Tokyo (JP)

(72) Inventor: Mona Mustapha, Cambridge (GB)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,446

(22) Filed: Feb. 14, 2020

(65) Prior Publication Data

US 2020/0187096 A1  Jun. 11, 2020

Related U.S. Application Data

(63) Continuation of application No. 16/688,236, filed on Nov. 19, 2019, which is a continuation of application No. 16/244,534, filed on Jan. 10, 2019, now Pat. No. 10,512,031, which is a continuation of application No. 12/311,530, filed as application No. PCT/JP2007/069632 on Oct. 2, 2007, now Pat. No. 10,187,848.

(30) Foreign Application Priority Data

Oct. 4, 2006 (GB) .................................. 0619614

(51) Int. Cl.
*H04W 48/14* (2009.01)
*H04J 11/00* (2006.01)

(52) U.S. Cl.
CPC ......... *H04W 48/14* (2013.01); *H04J 11/0069* (2013.01)

(58) Field of Classification Search
CPC ............. H04W 72/04; H04W 72/0446; H04W 72/0453; H04W 88/08; H04W 76/00; H04B 7/2643; H04B 7/2656; H04L 1/189; H04L 1/1887
See application file for complete search history.

(56) References Cited

U.S. PATENT DOCUMENTS

| | | |
|---|---|---|
| 5,742,910 A | 4/1998 | Gallant et al. |
| 6,047,071 A | 4/2000 | Shah |
| 6,148,204 A | 11/2000 | Urs et al. |

(Continued)

FOREIGN PATENT DOCUMENTS

| | | |
|---|---|---|
| CN | 1370018 A | 9/2002 |
| EP | 1 987 602 B1 | 7/2014 |

(Continued)

OTHER PUBLICATIONS

NTT DOCOMO, LG Electronics: "R2-062162 System Information Structure in LTE" 3GPP TSG-RAN Working Group 2#54, Aug. 28-Sep. 1, 2006 Tallinn, Estonia, Aug. 23, 2006, XP002465834.

(Continued)

*Primary Examiner* — Awet Haile
(74) *Attorney, Agent, or Firm* — Sughrue Mion, PLLC

(57) ABSTRACT

In a method for use in a base station of a mobile telecommunications system, primary system information is maintained and is periodically broadcast while secondary system information is broadcast in response to a trigger event.

12 Claims, 6 Drawing Sheets

(56) References Cited

U.S. PATENT DOCUMENTS

| | | | |
|---|---|---|---|
| 6,571,101 B1* | 5/2003 | Schulz | H04W 74/006 455/450 |
| 6,628,946 B1 | 9/2003 | Wiberg et al. | |
| 7,139,561 B2 | 11/2006 | Ikeda et al. | |
| 7,447,486 B2 | 11/2008 | Tamura et al. | |
| 2002/0072378 A1* | 6/2002 | Gaal | G01S 5/0045 455/456.5 |
| 2002/0114315 A1* | 8/2002 | Kangas | H04W 48/14 370/349 |
| 2002/0164982 A1 | 11/2002 | Ikeda et al. | |
| 2002/0191562 A1 | 12/2002 | Kumaki et al. | |
| 2003/0050072 A1* | 3/2003 | Noerpel | H04B 7/18539 455/452.1 |
| 2003/0163551 A1 | 8/2003 | Riordan | |
| 2003/0186704 A1 | 10/2003 | Tamura et al. | |
| 2004/0063428 A1 | 4/2004 | Jansson | |
| 2005/0026622 A1 | 2/2005 | Georgeaux et al. | |
| 2005/0075125 A1 | 4/2005 | Bada et al. | |
| 2005/0111393 A1 | 5/2005 | Jeong et al. | |
| 2005/0207388 A1 | 9/2005 | Rinne et al. | |
| 2006/0056341 A1 | 3/2006 | Takagi et al. | |
| 2006/0280144 A1 | 12/2006 | Kangas | |
| 2007/0026807 A1 | 2/2007 | Kish | |
| 2007/0116094 A1 | 5/2007 | Parts et al. | |
| 2007/0147326 A1 | 6/2007 | Chen | |
| 2007/0211745 A1* | 9/2007 | Deshpande | H04L 12/12 370/432 |
| 2008/0016424 A1 | 1/2008 | Chen | |
| 2008/0057948 A1 | 3/2008 | Mittal et al. | |
| 2008/0072269 A1 | 3/2008 | Malladi et al. | |
| 2009/0010219 A1 | 1/2009 | Lee et al. | |
| 2009/0161651 A1 | 6/2009 | An et al. | |
| 2009/0219860 A1 | 9/2009 | Tanno et al. | |
| 2010/0195579 A1* | 8/2010 | Park | H04W 74/006 370/329 |

FOREIGN PATENT DOCUMENTS

| | | |
|---|---|---|
| EP | 2 816 741 A2 | 12/2014 |
| EP | 2 393 325 B1 | 8/2015 |
| GB | 2419784 A | 5/2006 |
| JP | 2003-283422 A | 10/2003 |
| JP | 2005-525725 A | 8/2005 |
| JP | 2005-294943 A | 10/2005 |
| WO | 00/72609 A1 | 11/2000 |
| WO | 01/93612 A1 | 12/2001 |
| WO | 02/43430 A1 | 5/2002 |
| WO | 02/054818 A1 | 7/2002 |
| WO | 02/056616 A2 | 7/2002 |
| WO | 2005/006829 A2 | 1/2005 |
| WO | 2006/040115 A1 | 4/2006 |

OTHER PUBLICATIONS

NTT DOCOMO, Mitsubishi Electric, NEC et al.: "R1-061198", 3GPP TSG-RAN Working Group 1#45, May 8-12, 2006 Shanghai, China May 2, 2006, XP002465838.

Samsung: "R2-062264 BCCH content delivery mechanism", 3GPP TSG-RAN Working Group 2#54, Aug. 28-Sep. 1, 2006 Tallinn, Estonia, Aug. 23, 2006, XP002465835.

Xuan, P. et al., Broadcast on demand: efficient and timely dissemination of data in mobile environments, Real-Time Technology and Applications Symposium, 1997. Proceedings., Third IEEE, Jun. 9, 1997, (searched on Dec. 13, 2011) , URL, http://ieeexplore.ieee.org/xpls/abs_all.jsp?arnumber=601342.

Communication dated Sep. 28, 2014, issued by the State Intellectual Property Office of the People's Republic of China in corresponding Chinese Application No. 201210366911.7.

Japanese Office Action dated Dec. 21, 2012 with a partial English translation.

NEC: "R2-062930 LTE BCH-on-demand", 3GPP TSG-RAN Working Group 2#55, Oct. 9-13, 2006 Seoul, Korea, Oct. 5, 2006, XP002465836.

Nokia: "R2-062208 System Information Distribution" 3GPP TSG-RAN Working Group 2#54, Aug. 28-Sep. 1, 2006 Tallinn Estonia Aug. 23, 2006 XP002465837.

3GPP TS 36. 300 V8.0.0, "3rd Generation Partnership Project; Technical Specification Group Radio Access Network; Evolved Universal Terrestrial Radio Access(E-UTRA) and Evolved Universal Terrestrial Radio Access Network (E-UTRAN); Overall description; Stage 2 (Release 8)", Mar. 2007, 82 pages.

Qualcomm Europe, "Design and Performance of BCH for E-UTRA", 3GPP TSG RAN1 #46, R1-062038, Aug. 28-Sep. 1, 2006, 7 pages.

LG Electronics, "Considerations on BCH and 20 MHz system BW", 3GPP TSG RAN WG1#44 / RAN WG2#52, R2-060903, Feb. 13-17, 2006, 3 pages.

LG Electronics, "LTE System Information", TSG-RAN Working Group 2 #53, R2-061476, May 8-12, 2006, 4 pages.

Infineon, "Principles for BCCH scheduling", 3GPP TSG RAN WG2 Ad Hoc on LTE, Tdoc R2-061851, Jun. 27-30, 2006, 3 pages.

NEC, "BCH Scheduling", 3GPP TSG-RAN WG2 #54, R2-062333, Aug. 28-Sep. 1, 2006, 2 pages.

Qualcomm Europe, "Considerations on BCH Content", 3GPP TSG-RAN WG2 #54, R2-062361, Aug. 28-Sep. 1, 2006, 4 pages.

* cited by examiner

SIGNALLING IN MOBILE TELECOMMUNICATIONS

CROSS-REFERENCE TO RELATED APPLICATIONS

This application is a Continuation of Ser. No. 16/688,236, filed Nov. 19, 2019, which is a Continuation of U.S. application Ser. No. 16/244,534 filed Jan. 10, 2019, now U.S. Pat. No. 10,512,031, which is a Continuation of U.S. application Ser. No. 12/311,530 filed Apr. 2, 2009, now U.S. Pat. No. 10,187,848, which is a National Stage 371 Entry of PCT International Application No. PCT/JP2007/06932 filed Oct. 2, 2007, which claims the benefit of priority from UK patent application No. 0619614.1, filed on Oct. 4, 2006, the disclosures of which are incorporated herein in their entirety by reference.

TECHNICAL FIELD

The present invention relates to mobile telecommunications networks, particularly, but not exclusively to mobile telecommunications networks using the 3GPP standards and equivalents and derivatives thereof.

BACKGROUND ART

In mobile telecommunications networks, there is a need for a cell to signal to the user equipment (UE) in the cell the system parameters for the cell. This requires regular broadcast by the base station and consumes a portion of the available radio spectrum/bandwidth which might otherwise be used for communication. Typically, about five percent of base station power is used for broadcast channel transmission, which is significant in the overall scheme of communication.

DISCLOSURE OF INVENTION

W002/056616A proposed in a GPRS system that some of the system information is sent only on request directly to the requesting mobile device (and other active mobile devices sharing the same GPRS time slot). This has the drawback that only active UEs can request and receive requested system information, and only a proportion of active UEs can receive the requested system information.

According to a first aspect, there is provided a method of communicating system information in a base station of a mobile telecommunications system, the method comprising maintaining primary system information; maintaining secondary system information; periodically broadcasting the primary system information; in response to a trigger event, broadcasting the secondary system information.

With this method, only a relatively small amount of system information, the primary system information, is routinely broadcast, typically at regular relatively frequent intervals. Additionally, secondary system information is broadcast only in response to a trigger event. Because the secondary system information is broadcast, i.e. sent over a broadcast channel rather than a dedicated or shared channel, it can be received by devices other than the requesting device and e.g. devices which are in an idle mode can be "passively" updated without needing to request the information themselves.

The trigger event may comprise receipt of a request for secondary system information from user equipment (UE), which indicates that the secondary information is needed.

Additionally, the request may indicate the group or type of system information that is needed, e.g. system information for call setup.

In response to the trigger event, broadcast of the secondary system information is preferably scheduled for (shortly subsequent) broadcast, preferably based on cell resources; this allows the information to be efficiently transmitted. The content of the secondary system information could be based on the reason the UE requested the system information. If there are different UEs requesting different types of system information at the same time, then all system information may be broadcast.

The primary system information preferably includes scheduling information identifying the next broadcast of the secondary system information or a location where the scheduling information identifying the next broadcast of the secondary system information can be obtained.

The scheduling information may include time and channel information.

In one embodiment, in the absence of a trigger event, broadcast of the secondary system information is not scheduled. In an alternative embodiment, the secondary system information is scheduled at relatively long intervals, preferably at intervals including at least 5 broadcasts of the primary system information. This may be achieved either by using the trigger mechanism and generating a trigger event in response to a timeout or count of primary broadcasts, or by scheduling additional broadcasts periodically separately from the trigger mechanism. In one embodiment, there is a minimum interval between secondary system information transmissions. For example, if this minimum interval is five primary transmissions, then after transmitting secondary system information in response to a trigger, the network will wait for this interval before re-starting periodic secondary system information transmission.

Preferably the primary system information is transmitted at regular intervals.

The primary system information typically comprises an identifier of the cell and a set of cell radio parameters.

The secondary system information may comprise neighbor cell information.

A channel or code sequence (for example, a RACH code sequence) may be reserved for requests from user equipment for secondary system information and wherein a single trigger event is generated on receipt of overlapping requests from more than one user equipment.

In a second aspect, the invention provides a method of obtaining system information by user equipment of a mobile telecommunications system. the method comprising:

receiving primary system information broadcast by the cell;

determining from the primary system information scheduling information identifying broadcast of secondary system information;

receiving the secondary system information based on the received scheduling information.

The method may include in an idle mode waiting for scheduling of secondary system information in the absence of scheduled or received secondary system information.

The method may include, following transition to an active mode, in the absence of received secondary system information or scheduling information, requesting secondary system information.

Requesting may comprise using a reserved channel or code sequence to request secondary system information.

The method may include updating stored system information following receipt of broadcast primary or secondary system information.

The method may include camping on a cell based on the received primary system information without requesting or receiving secondary system information.

A third aspect provides a base station including a radio interface and a transmission scheduler arranged to perform a method according to the first aspect or any preferred features.

A fourth aspect provides user equipment including a radio interface and a store for cell system information arranged to perform a method according to the second aspect or any preferred features.

The invention also provides a computer program or computer program product or computer readable medium comprising instructions which, when executed by a processing component of a mobile telecommunications system, cause the system to perform a method according to any method aspect.

BEST MODE FOR CARRYING OUT THE INVENTION

An exemplary embodiment will now be described with reference to the accompanying drawings.

One of the main objectives for LIE BCH design is to optimize the usage of the available resources. This means that the LIE BCH design must try to reduce the resources required by BCH and try to eliminate duplication of information transmitted by the network where possible. In the joint RAN 1-RAN2 meeting in Cannes, the-cost per bit of sending BCH was discussed. The conclusion was that the cost of BCH transmission in terms of instantaneous power consumption could be very high. We have proposed a method is to help reduce this power consumption. This document proposes a BCH-on-demand concept which is an enhancement for the secondary BCH (S-BCH) transmission. In this scheme, S-BCH is transmitted both:
  periodically with a very large interval, and
  when there is a demand for it. This demand is indicated in the form of RACH sent by UEs that need the S-BCH information.

1. BCH-On-Demand Mechanism

In UMTS, the main disadvantage of BCH is that it is transmitted regardless of whether UEs need the information or not. Typically, 5% of the base station power is used for BCH transmission, which is quite a significant proportion.

Unlike primary BCH (P-BCH), which has to be transmitted frequently to enable UE to efficiently perform cell search procedure, S-BCH may not need to be transmitted regularly if there is no UE in the cell or if no UE wants to read it urgently. Thus, to further reduce the instantaneous power requirement for BCH and to optimize usage of network resources, it is proposed to have a periodic S-BCH with very long interval.

In addition, to help reduce delay in obtaining S-BCH, it is proposed to also have an "on-demand S-BCH". The content of periodic S-BCH and on-demand S-BCH would normally be the same. However, the content of on-demand S-BCH may be tailored to the intention of the UE requesting it, e.g. UEs that want on-demand S-BCH to make a call could send related parts of the system information.

Figure 1:
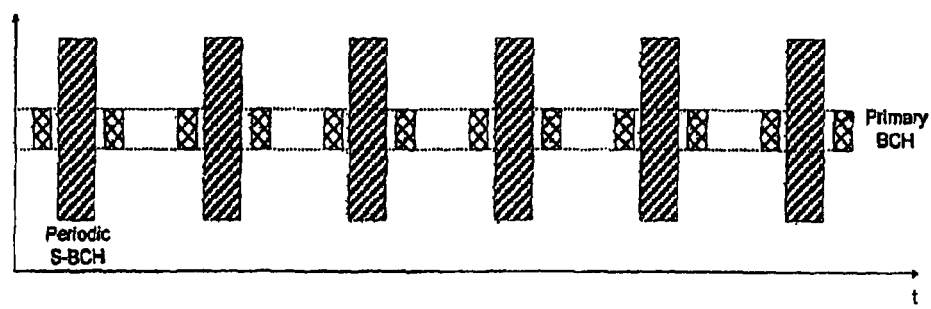
FIG. 1 illustrates conventional periodic broadcast of System information.
Figure 2:
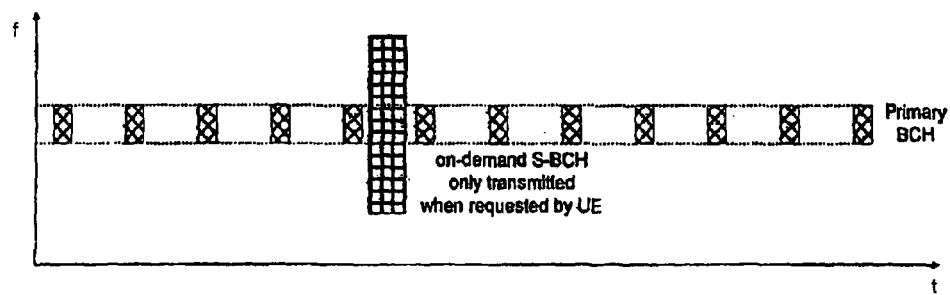
FIG. 2 illustrates broadcast of system information in accordance with a first embodiment in which secondary system information is transmitted only on demand.
Figure 3:
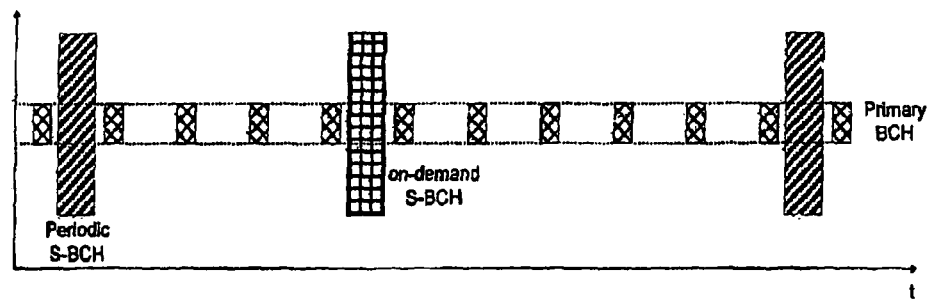
FIG. 3 illustrates broadcast of system information in accordance with a second embodiment in which secondary system information is transmitted on demand, and additionally at extended intervals.

Although this proposal is mainly to allow idle UEs to request S-BCH to be transmitted, it does not preclude allowing connected UEs to request S-BCH to be scheduled e.g. via L2 or L3 signalling. FIGS. 1 to 3 illustrate conventional, on demand and on demand plus extended interval signalling of secondary system information.

For the on-demand S-BCH, UE can indicate it requires S-BCH by sending RACH preamble e.g. with a specific cause value or specific random ID.

In the following sections, we discuss the different scenarios in which UE will need S-BCH. These are:
  Case 1: UE has S-BCH stored in memory and wants to connect to network;
  Case 2: UE does not have S-BCH of the cell and needs S-BCH to connect to network;
  Case 3: UE does not have S-BCH of the cell and needs S-BCH to remain in idle (and possibly connect to network at a later time)

(Note: This document considers the case where S-BCH scheduling information is provided on P-BCH. Other methods of providing scheduling information for S-BCH, such as L1/L2 control signalling could also be considered.)

1.1 Case 1: UE has S-BCH Stored in Memory and Wants to Connect to Network:

When the UE has stored S-BCH information in memory, UE will not normally need to read S-BCH again for the same cell, unless the information has changed. If the information has not changed, UE may use this S-BCH information at a later time to initiate procedures e.g. tracking area update.

This is the "normal" RACH procedure where UE sends RACH and receives RACH response with e.g. resource allocation information.

In this case, the cause value or random ID used in the RACH preamble would indicate that UE does not require S-BCH.

1.2 Case 2: UE does not have S-BCH and Needs S-BCH to Connect to Network

When the UE arrives in a new cell and needs to connect to the network e.g. to make a call, the UE has 2 alternatives to obtain S-BCH information:
  a. wait for the next periodic S-BCH;
  b. request for on-demand S-BCH by sending RACH preamble.

The UE may wait for the next periodic S-BCH if waiting does not impact the performance of the procedure UE wants to perform.

Figure 4:
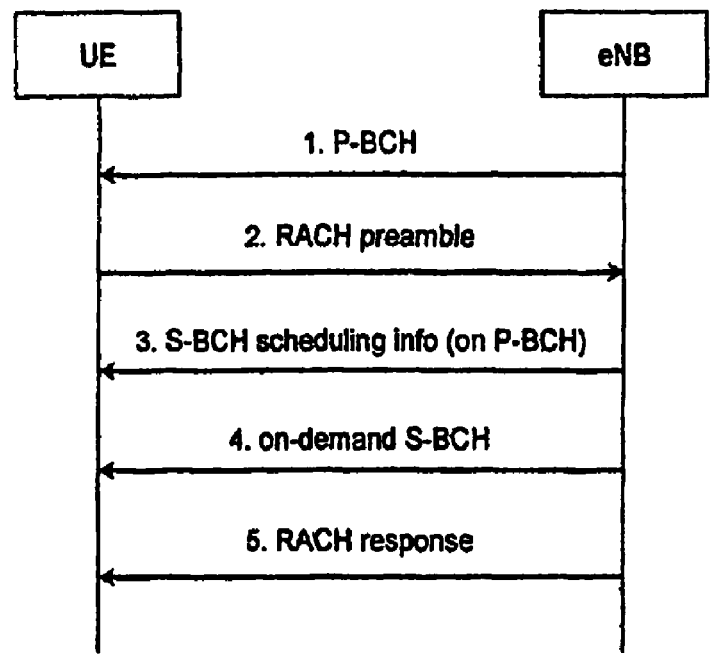
FIG. 4 illustrates a first proposed signalling sequence.

If the UE decides that it cannot wait for the periodic S-BCH and wants to request on-demand S-BCH, the sequence shown in FIG. 4 is proposed.

1. When an idle UE arrives in a cell, it reads the fixed pre-defined P-BCH that gives it information necessary to camp on the cell. The P-BCH may also provide scheduling information for the variable S-BCH. Within this scheduling information, there will be an indication of when the next periodic S-BCH will be available. UE can decide, based on this information and also on the procedure UE wants to perform, whether to wait for periodic S-BCH or request on-demand S-BCH to be sent.

2. Assuming the UE needs to make a call and the additional delay to wait for the next periodic S-BCH cannot be tolerated, the UE will send a RACH to request on-demand S-BCH transmission and to start the call. This could be indicated by a cause value in the RACH preamble.

3. Upon receiving RACH that indicates UE wants on-demand S-BCH and then proceed with another procedure, the eNB schedules resources for on-demand S-BCH and broadcasts this information on P-BCH. It may be possible for eNB to schedule only system information that a "call setup" UE would need, e.g. neighbor cell information. UE reads P-BCH to get scheduling information for on-demand S-BCH.

4. UE reads the on-demand S-BCH.

5. eNB sends RACH response to allocate resources for the UE.

Note that this does not preclude eNB sending RACH response and on-demand S-BCH at the same time.

1.3 Case 3: UE does not have S-BCH and Needs S-BCH to Remain in Idle:

Here, the case when an idle UE arrives in a cell and wants to remain in idle is considered. The UE needs to read S-BCH in order to get e.g. cell (re)selection parameters and other information needed to be in idle.

In this case, as in Case 2, it may be possible for the UE to wait for the periodic S-BCH. Alternatively, UE may decide that it cannot wait for the periodic S-BCH and sends a RACH to get an on-demand S-BCH.

Figure 5:
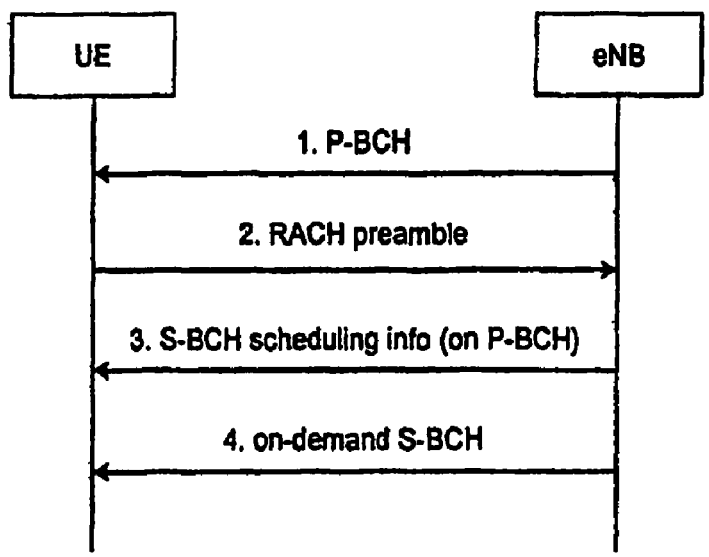
FIG. 5 illustrates a second proposed signalling sequence.
Figure 6:
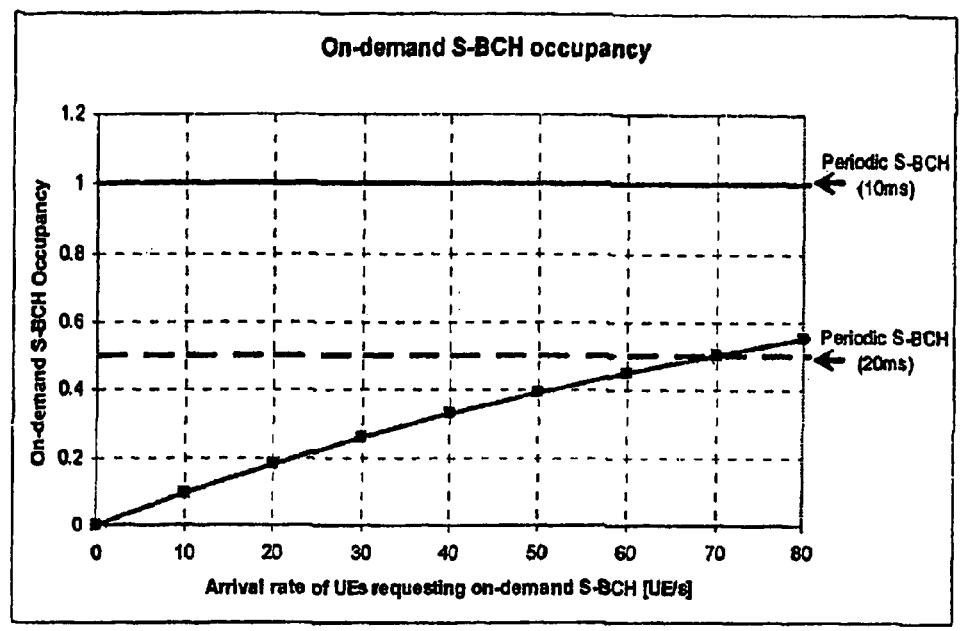
FIG. 6 graphically illustrates the effective cell resource savings.

The sequence of FIG. 5 is proposed for the on-demand S-BCH case.

The differences between this procedure and procedure in Case 2:

In step 2, the RACH preamble could contain a cause that indicates UE only needs on-demand S-BCH and does not want to continue to connect to the network.

No RACH response message is needed

2. Advantages 2.1 S-BCH Resource Savings

The main advantage of the BCH-on-demand mechanism is that it allows the network to save S-BCH resources when there are no UEs that require S-BCH transmission.

To try and get an idea of the possible savings, the probability of on-demand S-BCH transmission in a particular interval is analyzed. If the mean arrival rate of UEs that needs on-demand S-BCH is λ UEs per second, then the probability that at least one UE arrives during an interval of T seconds is:

$$P(N>0) = 1 - e^{-\lambda T}$$

It is assumed that P-BCH provides the on-demand S-BCH scheduling information, i.e. P-BCH period determines the upper bound of the on-demand S-BCH transmission. If T is the P-BCH period then P(N>0) is the S-BCH occupancy, i.e. the fraction of P-BCH transmissions in which the on-demand S-BCH is also transmitted.

Referring to the RACH traffic model provided in R2-062160, RACH Contention and Retry Cases, NTT DoCoMo, NEC, if the case where 6 non-realtime service call attempts are used, the number of RACH attempts when 1000 UEs are camped in the cell is ~40 "normal" RACH attempts per second. According to the procedure outlined in section 1.2 and 1.3 of this document, only a fraction of the total number of "normal" RACH attempts will require UE to request on-demand S-BCH.

The on-demand S-BCH occupancy is plotted in the following graph for P-BCH interval of T=10 ms, which means that the maximum rate of on-demand S-BCH transmission is equal to 10 ms periodic S-BCH transmission. The graph also shows the S-BCH occupancy for periodic S-BCH with intervals of 10 ms and 20 ms. The x-axis represents the number of UEs requesting on-demand S-BCH arriving every second. The maximum range of 80 was used, which is double the value of "normal" RACH attempts discussed in the previous paragraph.

From the graph, if the arrival rate of UEs requesting on-demand S-BCH is 40 UEs per second then the S-BCH occupancy saving compared with the 10 ms periodic S-BCH is about 70%. When compared with the 20 ms periodic S-BCH case, the resource saving is about 35% and, as a bonus, the maximum delay in acquiring on-demand S-BCH is halved.

2.2 Impact to RACH

For Case 2, i.e, UEs that do not have S-BCH stored in memory and require S-BCH to connect to the network, it is possible to assume that this is not a frequent occurrence. The on-demand S-BCH scenario that may have an impact to the RACH loading and contention is Case 3, i.e. UEs that want S-BCH to remain in idle.

To alleviate problems due to RACH contention, Case 3 UEs may be mandated to wait for the periodic S-BCH e.g. if the waiting time does not exceed a certain threshold.

Further, a single RACH random ID may be reserved for Case 3, i.e. UEs requesting on-demand S-BCH and remaining idle. In this way, even when more than one UE sends RACH for the same purpose at the same time, this will not result in any contention for S-BCH. The eNB will interpret this as a single request and schedule the on-demand S-BCH normally.

To further reduce impact of Case 3 RACHs to the overall RACH loading, it is possible to limit RACH allocation that allows UE to send RACH for this purpose. This is possible because delay in getting S-BCH transmission is not so critical for these UEs.

2.3 Timing Relationship and Impact to Call Setup Delay:

In UMTS, the delay related to reading BCH information is bound by the BCH scheduling interval. To optimize the delay in reading BCH and the consumption of base station transmit power, a careful balance between the two requirements is needed. With the proposed combined periodic and on-demand S-BCH mechanism, the balance between the two requirements can be relaxed.

Figure 7:
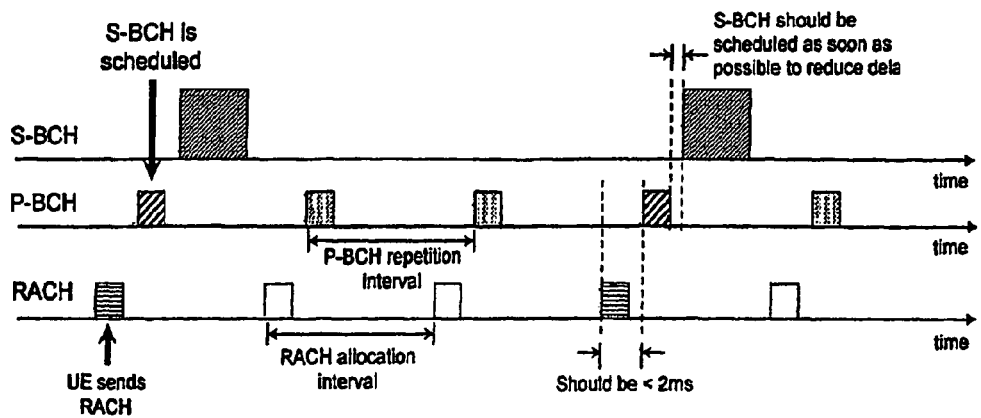
FIG. 7 illustrates timing relationships in a typical embodiment.

The timing relationship between RACH, P-BCH and on-demand S-BCH is illustrated in FIG. 7.

The delay between RACH preamble and the P-BCH that contains the on-demand S-BCH scheduling information should not be more than 2 ms, as 2 ms is the comparable UMTS delay between RACH preamble and AICH [25.211].

It can be seen from the timing relationship diagram that the delay reading on-demand S-BCH is bound by the scheduling interval for P-BCH, i.e. the interval for on-demand S-BCH scheduling information, and the interval between available RACH resource blocks.

In case the UE arrival rate is very high, one way to avoid sending on-demand S-BCH too frequently is by setting either the on-demand S-BCH scheduling information interval or RACH allocation interval to give the maximum desired on-demand S-BCH frequency.

3. Conclusion

The following modification to conventional 3GPP signalling is proposed:

Secondary BCH is transmitted both periodically and on demand when UE sends a request either via non-synchronized RACH or other means e.g. L2/L3 signalling.

Figure 8:
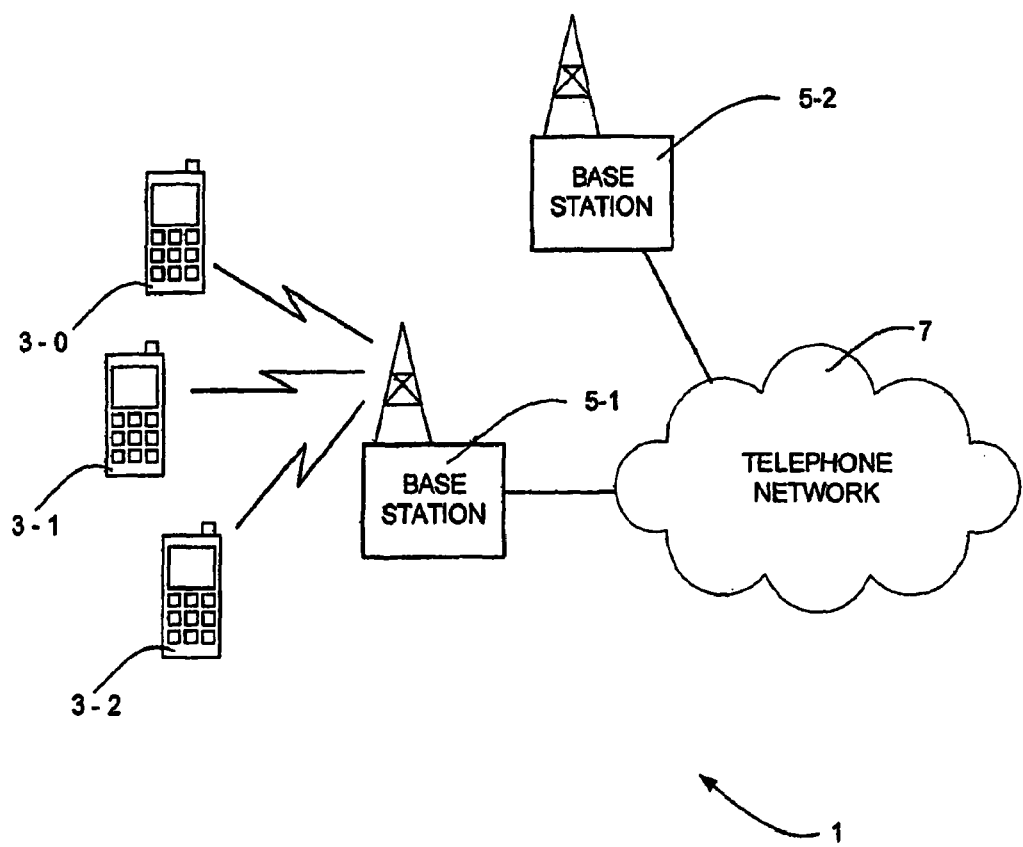
FIG. 8 schematically illustrates a mobile telecommunication system of a type to which the embodiment is applicable.

FIG. 8 schematically illustrates a mobile (cellular) telecommunication system 1 in which the invention described above can be implemented. In this illustration, the UEs are mobile (cellular) telephones (MT) 3-0, 3-1, and 3-2 and the eNBs are the base stations 5-1 or 5-2. The mobile telephones 3 can communicate with each other and to other users via the base stations 5 and the telephone network 7.

Base Station

Figure 9:
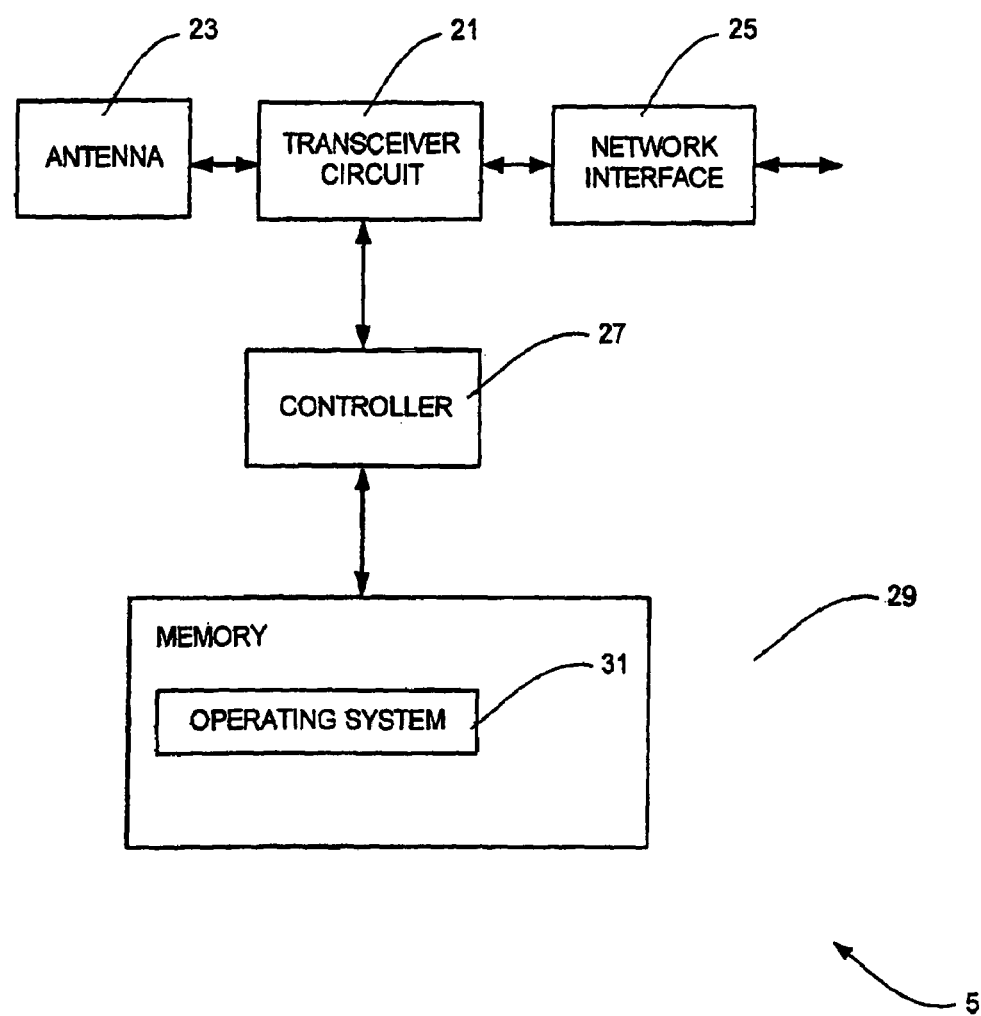
FIG. 9 schematically illustrates a base station forming part of the system shown in FIG. 8.

FIG. 9 is a block diagram illustrating the main components of each of the base stations 5 used in this embodiment. As shown, each base station 5 includes a transceiver circuit 21 which is operable to transmit signals to and receive signals from the mobile telephones 3 via one or more antennae 23 and which is operable to transmit signals to and receive signals from the telephone network 7 via a network interface 25. A controller 27 controls the operation of the transceiver circuit 21 in accordance with software stored in memory 29. The software includes, among other things, an operating system 31 that controls the operation of the base station in the manner discussed above.

Mobile Telephone

Figure 10:
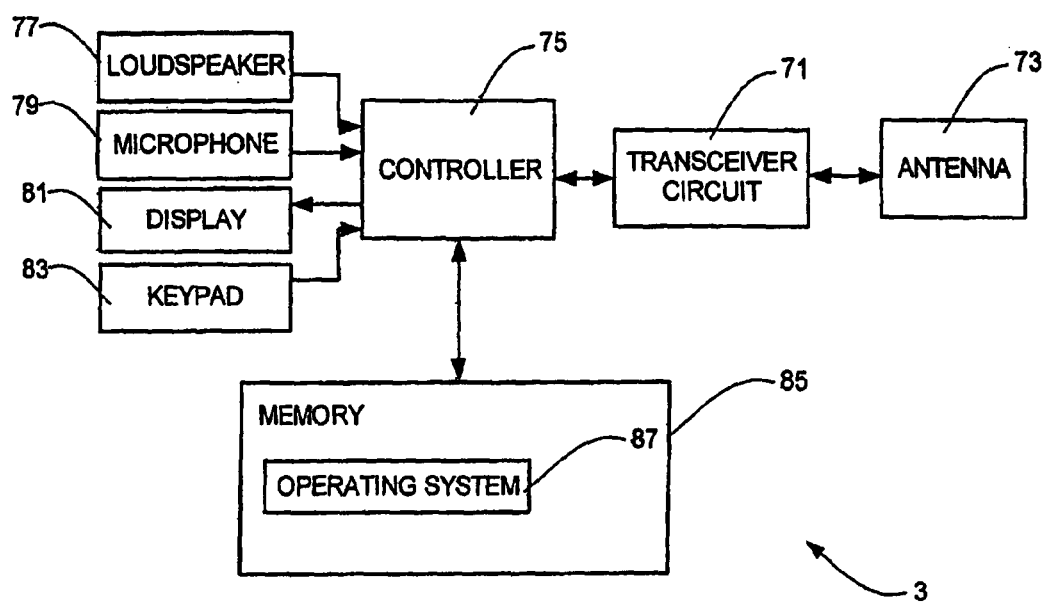
FIG. 10 schematically illustrates a mobile communication device forming part of the system shown in FIG. 8.

FIG. 10 schematically illustrates the main components of each of the mobile telephones 3 shown in FIG. 8. As shown, the mobile telephones 3 include a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 that controls the operation of the mobile telephone in the manner described above.

The invention claimed is:

1. A method for a user equipment (UE), the method comprising:
receiving first system information that is broadcast by a base station, and that comprises information relating to on-demand system information,
wherein the on-demand system information comprises information that is transmitted by the base station but not broadcast in the first system information;
transmitting, to the base station, a request message of a random access procedure based on the information relating to the on-demand system information, the request message being a request for the on-demand system information; and
receiving, from the base station, the on-demand system information in response to the transmitted request message.

2. The method according to claim 1, wherein the request message comprises a random access channel (RACH) preamble.

3. The method according to claim 1, wherein the information relating to on-demand system information is a schedule information of the on-demand system information.

4. A method for a radio station, the method comprising:
broadcasting, first system information that comprises information relating to on-demand system information,
wherein the on-demand system information comprises information that is transmitted by the base station but not broadcast in the first system information;
receiving a request message of a random access procedure that is transmitted from a user equipment (UE) based on the information relating to the on-demand system information, the request message being a request for the on-demand system information; and
transmitting the on-demand system information in response to receiving the transmitted request message.

5. The method according to claim 4, wherein the request message comprises a random access channel (RACH) preamble.

6. The method according to claim 4, wherein the information relating to on-demand system information is a schedule information of the on-demand system information.

7. A user equipment (UE) comprising:
a memory; and
at least one processor coupled to the memory and configured to:
receive first system information that is broadcast by a base station, and that comprises information relating to on-demand system information,
wherein the on-demand system information comprises information that is transmitted by the base station but not broadcast in the first system information;
transmit, to the base station, a request message of a random access procedure based on the information relating to the on-demand system information,
wherein the request message is configured as a request for the on-demand system information; and
receive, from the base station, the on-demand system information in response to the transmitted request message.

8. The UE according to claim 7, wherein the request message comprises a random access channel (RACH) preamble.

9. The UE according to claim 7, wherein the information relating to on-demand system information is a schedule information of the on-demand system information.

10. A radio station comprising:
a memory; and
at least one processor coupled to the memory and configured to:
broadcast, first system information that comprises information relating to on-demand system information,
wherein the on-demand system information comprises information that is transmitted by the base station but not broadcast in the first system information;
receive a request message of a random access procedure that is transmitted from a user equipment (UE) based on the information relating to the on-demand system information,
wherein the request message is configured as a request for the on-demand system information; and transmit the on-demand system information in response to receiving the transmitted request message.

11. The radio station according to claim 10, wherein the request message comprises a random access channel (RACH) preamble.

12. The radio station according to claim 10, wherein the information relating to on-demand system information is a schedule information of the on-demand system information.

* * * * *